United States Patent Office
3,132,140
Patented May 5, 1964

3,132,140
SCHIFF BASES AND METAL CHELATE
PIGMENTS MADE THEREFROM
Edward E. Jaffe, Union, N.J., assignor to E. I. du Pont de Nemours and Company, Wilmington, Del., a corporation of Delaware
No Drawing. Filed May 10, 1961, Ser. No. 108,999
7 Claims. (Cl. 260—240)

This invention relates to new and useful Schiff bases and to new and useful metal complexes of these Schiff bases.

Schiff bases or anils are compounds in which both hydrogen atoms of the amino group of an aromatic amine are replaced by a divalent organic radical. A typical illustration of a Schiff base is benzylideneaniline which is formed by the condensation of benzaldehyde with aniline as follows:

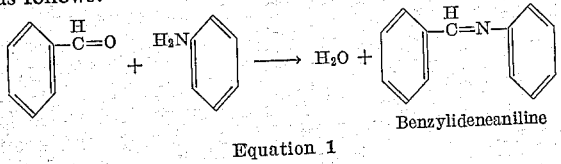

Equation 1

The present invention is directed to new double Schiff bases of the following structural formula:

FORMULA 1

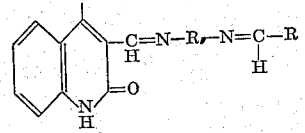

in which R is an aromatic radical of the group consisting of

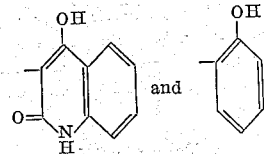

and R' is a phenylene radical of the group consisting of:

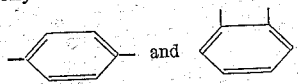

These new Schiff bases are colored products, and they are intermediates which form colored complexes with such metals as copper, zinc, nickel, and the like, in which there is an average of one metal atom per molecule of the Schiff base. Such complexes may be represented by the following structural formula:

FORMULA 2

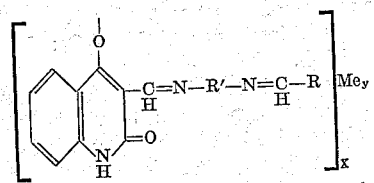

in which R and R' are the same as in Formula 1; Me is a metal of the group consisting of copper, zinc, and nickel; and x and y are the same whole numbers and they are either 1 or 2. The nickel complexes of the Schiff bases of Formula 1 are of particular interest as new yellow pigments having high strength, excellent lightfastness, and superior resistance to bleeding in organic solvents.

The Schiff bases of this invention are produced by the condensation of an aldehyde with a phenylenediamine. In a preferred embodiment of this invention, two mols of the aldehyde of 2,4-dihydroxyquinoline, usually known as 3-formyl-4-hydroxycarbostyril, are condensed with one mol of p-phenylenediamine to give an insoluble yellow compound which is further reacted with a nickel salt, such as nickel acetate, preferably in a high-boiling polar solvent, to give a highly insoluble yellow compound of excellent lightfastness and other pigmentary properties.

For a clearer understanding of the invention, the following specific examples are given. These examples are intended to be merely illustrative of the invention and not in limitation thereof. Unless otherwise specified, all parts are by weight.

Example 1

Part A.—The reaction carried out in Part A of this example is represented by the equation appearing below wherein 2 mols of 3-formyl-4-hydroxycarbostyril are condensed with one mol of p-phenylenediamine:

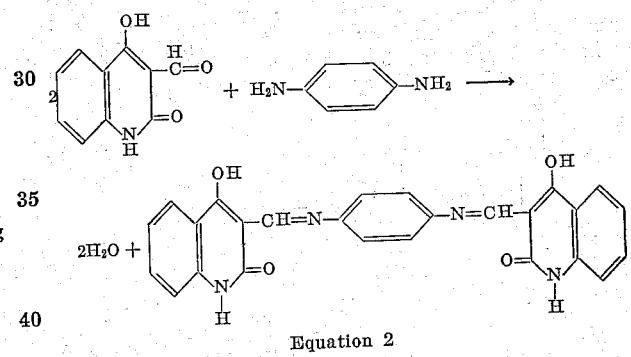

Equation 2

37.8 parts (0.2 mol) of 3-formyl-4-hydroxycarbostyril is suspended in 1000 parts of n-butanol to which is then added 10.8 parts (0.1 mol) of p-phenylenediamine. The mixture is heated to the boil under good agitation and is boiled under reflux for about 4 hours. The first reaction product is the reddish yellow mono-condensation product which is converted on further boiling to a pale greenish yellow product. The slurry is cooled and the product isolated by filtering and washing with ethanol to give 45 parts (100% yield). A small sample was purified by extraction with boiling dimethylformamide and then subjected to elementary analysis.

Analysis.—Calculated for $C_{26}H_{18}N_4O_4$: C, 69.4%; H, 4.0%; N, 12.44%. Found: C, 69.36%; H, 4.27%; N, 11.96%.

Part B: Formation of nickel complex.—22.5 parts (0.05 mol) of the product of Part A is dispersed in 750 parts of dimethylformamide to which is then added 19 parts (0.075 mol) of nickel acetate $(Ni(C_2H_3O_2)_2 \cdot 4H_2O)$. The mixture is heated at the boil under reflux for about 3 hours, filtered hot and washed with water until free of soluble nickel. Upon drying, there is obtained 25.5 parts (100% of theory) of a brilliant yellow product.

*Analysis.*—Calculated for $C_{52}H_{32}N_8O_8Ni_2$: Ni, 11.55%; C, 61.6%; H, 3.16%. Found: Ni, 10.8%; C, 60.0%; H, 3.0%.

On the basis of the above analysis and the Schiff base used, the product is considered to have the following structural formula:

FORMULA 3

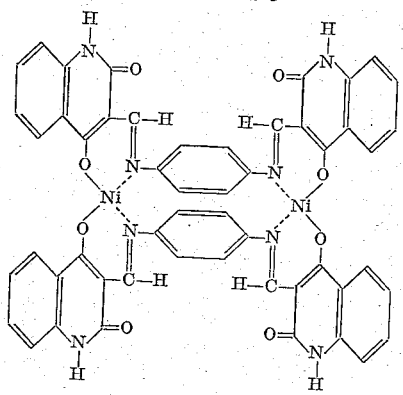

Upon dispersion in a coating composition such as an alkyd resin enamel, it gives an intense, strong yellow finish which shows excellent lightfastness after 500 hours in an Atlas "Fad-O-Meter." It is heat resistant on baking and completely resistant to bleeding on overstripe tests and in hot paraffin and, in contrast to many prior art chelated pigments, it is stable in acid-catalyzed alkyd resins.

Example II

*Part A.*—The reaction carried out in Part A of this example differs from Example I in that o-phenylenediamine is used in place of p-phenylenediamine. The reaction is represented by the equation appearing below wherein 2 mols of 3-formyl-4-hydroxycarbostyril are condensed with 1 mol of o-phenylenediamine:

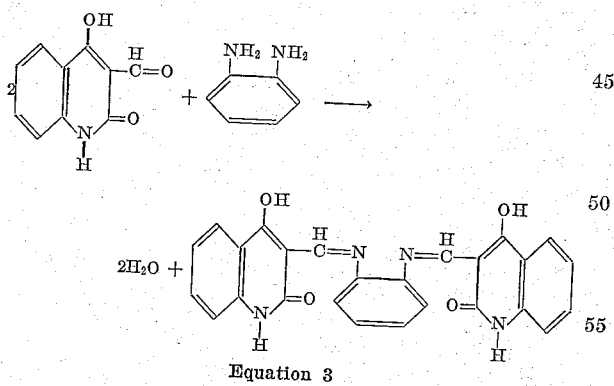

Equation 3

37.8 parts of 3-formyl-4-hydroxycarbostyril is suspended in 1000 parts of n-butanol to which is then added 10.8 parts of orthophenylenediamine. The mixture is heated to the boil under good agitation and boiled under reflux for about 4 hours. The slurry is cooled and the product isolated by filtering, washing with ethanol and drying to give 41 parts (91% yield) of a yellow solid.

*Analysis.*—Calculated for $C_{26}H_{18}N_4O_4$: N, 12.44%. Found: N, 11.87%.

*Part B: Formation of nickel complex.*—22.5 parts (0.05 mol) of the yellow product of Part A is slurried in 750 parts of dimethylformamide along with 19 parts (0.075 mol) of nickel acetate $(Ni(C_2H_3O_2)_2 \cdot 4H_2O)$. The mixture is then heated at the boil under reflux for about 2.5 hours. It is filtered hot and washed free of soluble nickel with water and finally dried to give 24.5 parts (100% of theory) of an intense reddish yellow pigment.

*Analysis.*—Calculated for $C_{26}H_{16}N_4O_4Ni$: Ni, 11.6%. Found: Ni, 12.5%.

On the basis of the above analysis and the Schiff base used, the product is considered to have the following structural formula:

FORMULA 4

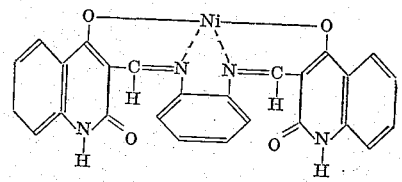

When the metal complex of this example is used in a coating composition, finishes obtained from such compositions are red shade yellows of excellent lightfastness. They are non-bleeding in overstripe tests and in hot oils.

Example III

PREPARATION OF SCHIFF BASE IN AN AQUEOUS SYSTEM 189 parts of 3-formyl-4-hydroxycarbostyril is suspended in about 4000 parts of water, and the slurry is adjusted to a pH of about 3.0 with $H_2SO_4$. 54 parts of p-phenylenediamine is then added, the slurry is heated to boil and boiled for about 1 hour. A pale greenish yellow precipitate is isolated by filtering, washing free of sulfate ion and drying to give 190 parts of dry product which is principally the desired Schiff base but may contain an unpredictable though relatively small amount of the mono-condensation product. Fortunately, this mono-condensation product, on treatment with boiling dimethylformamide, readily disproportionates to give the desired Schiff base plus free phenylene diamine. Accordingly, in preparing the nickel complex in this case, it is carried out as in Part B of Example I except that it is preferred to add the Schiff base to the dimethylformamide and heat it to the boil for a brief period before adding the nickel salt.

As a variation on this process, it is convenient to use a slurry of 3-formyl-4-hydroxycarbostyril as obtained by the reaction of 2,4-dihydroxyquinoline with chloroform and sodium hydroxide in an aqueous suspension, without prior isolation of the aldehyde; in which case, an appropriate increase in acid is required to neutralize the alkali present and provision should be made for removing excess chloroform by steam distillation during the reaction period at the boil.

Example IV

This example illustrates the preparation of an unsymmetrical Schiff base wherein two different aldehydes are reacted with p-phenylenediamine.

*Part A.*—18.9 parts (0.1 mol) of 3-formyl-4-hydroxycarbostyril is suspended in 650 parts of ethanol along with 10.8 parts (0.1 mol) of p-phenylenediamine. The mixture is thoroughly stirred and then heated slowly to the boil and boiled under reflux for about 1 hour to give a red shade yellow solid in suspension. After cooling, the solid is isolated by filtering, washing with alcohol and drying to give 27.9 parts of a yellow solid (100% of theory for a mono-condensation product).

*Analysis.*—Calculated for $C_{16}H_{10}N_3O_2$: N, 15.05%. Found: N, 14.8%.

*Part B.*—The solid from Part A (27.9 parts) is suspended in 800 parts of n-butanol to which 12.2 parts of salicylaldehyde is added and the mixture is boiled under reflux for about 4 hours. It is then cooled, filtered, washed with alcohol and dried to give about 30 parts (78% yield) of the following unsymmetrical condensation product (Schiff base):

FORMULA 5

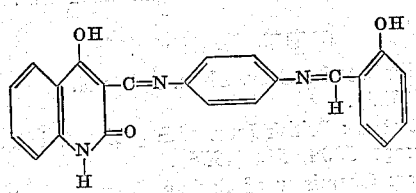

Part C.—19 parts of the above Schiff base is suspended in 1000 parts of dimethylformamide along with 19 parts of nickel acetate ($Ni(C_2H_3O_2)_2 \cdot 4H_2O$) and the mixture is boiled under reflux for about 4 hours. It is cooled to 100° C., filtered, washed with alcohol and dried to give 19 parts of a yellow pigment which shows excellent lightfastness on testing an alkyd dispersion for about 375 hours in an Atlas "Fade-O-Meter."

Analysis.—Percent Ni found, 12.6%; calculated, 13.4%.

The aldehyde, 3-formyl-4-hydroxy-carbostyril, which is used as a starting material in this invention is a known compound which can be conveniently prepared in aqueous media by the well-known Riemer-Tiemann reaction. In this reaction, 2,4-dihydroxyquinoline (also known as 4-hydroxycarbostyril, and probably existing as a mixture of the keto and enol forms) is reacted with chloroform and a strong alkali such as sodium hydroxide, followed by acidification to liberate the free aldehyde. It is not essential to recover the aldehyde in dry form. If desired, the phenylenediamine can be added directly to the reaction mixture after the acidification step and the excess chloroform can be removed by steam distillation during which time the reaction of the aldehyde and the diamine is effected.

The condensation of the aldehyde with the diamine can be carried out in a variety of polar solvents. n-Butanol is shown in the examples, but ethanol, propanol, dimethylformamide, ethylene glycol, and the like may be used with equal success. Significantly, it is found that the reaction proceeds readily in an acidic aqueous medium (pH 3-5) as illustrated in Example III.

The nickel complexes can be successfully formed by reacting the Schiff base with a nickel salt of an organic acid in suspension in high-boiling polar solvent such as dimethylformamide, dimethylacetamide, dimethylsulfoxide, tetramethylene sulfone, and the like. Since the condensation to form the Schiff base can also be carried out in a high-boiling polar solvent such as dimethylformamide, it is possible and feasible that both the formation of the Schiff base and the metal complex can be carried out in succession in the same reaction medium without intermediate isolation of the Schiff base.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A compound of the following structural formula:

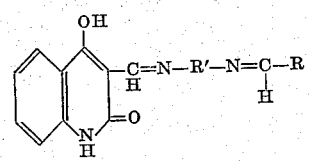

in which R is an aromatic radical selected from the group consisting of

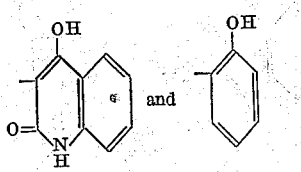

and R' is a phenylene radical selected from the group consisting of

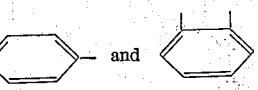

2. A compound of the following structural formula:

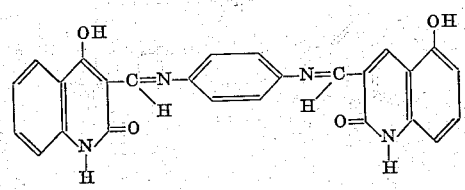

3. A compound of the following structural formula:

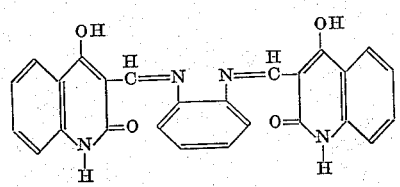

4. A compound of the following structural formula:

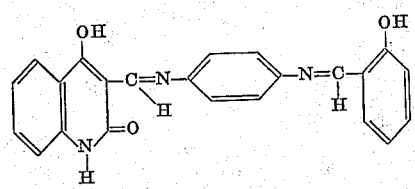

5. A nickel complex of the formula

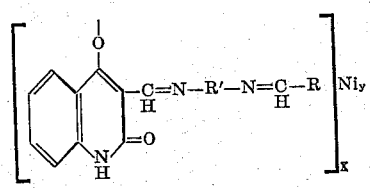

where x and y are 1-2 and they are the same whole numbers, R is an aromatic radical selected from the group consisting of

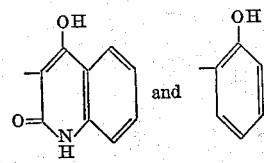

and R' is a phenylene radical selected from the group consisting of

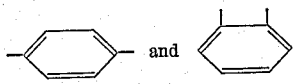

6. A nickel complex of the formula

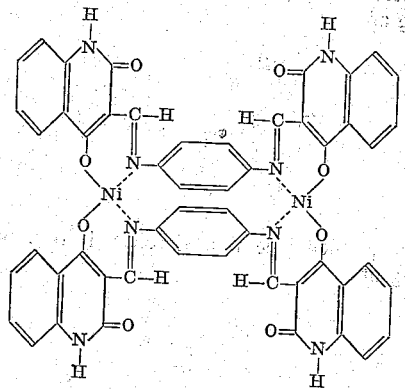

7. A nickel complex of the formula

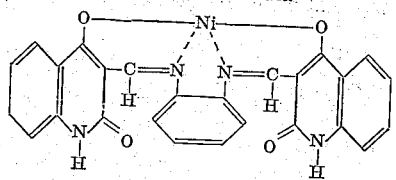

References Cited in the file of this patent

UNITED STATES PATENTS

| | | |
|---|---|---|
| 2,239,290 | Krzikalla et al. | Apr. 22, 1941 |
| 2,345,485 | Krzikalla et al. | Mar. 28, 1944 |

OTHER REFERENCES

Bargellini et al.: Gazz. Chim. Ital., vol. 53, pages 605 to 616 (1923).

Albert et al.: British Jour. of Experimental Pathology, vol. 37, pages 500 to 511 (1956).

Elsevier: Chemistry of Carbon Compounds, vol. IVA, pages 620–625, Elsevier Publishing Co., New York (1957).